United States Patent [19]

Levy et al.

[11] 3,864,144

[45] Feb. 4, 1975

[54] PROCESS FOR PREPARATION OF PHOTOCONDUCTIVE FILMS FROM INTRACTABLE MATERIALS

[75] Inventors: Moshe Levy, Rehovot, Israel; James M. Pearson, Webster; David J. Williams, Fairport, both of N.Y.

[73] Assignee: Xerox Corporation, Stamford, Conn.

[22] Filed: Mar. 19, 1973

[21] Appl. No.: 342,635

[52] U.S. Cl. .......... 117/34, 96/1.5, 96/1.6, 117/106 R, 117/132 B

[51] Int. Cl. .......... B44d 1/14, B32b 27/06

[58] Field of Search ... 117/106 R, 34, 132, 138.8 R; 96/1.5, 1.6; 260/88.3; 252/501

[56] References Cited

UNITED STATES PATENTS

| | | | |
|---|---|---|---|
| 3,246,627 | 4/1966 | Loeb et al. | 117/106 R |
| 3,251,686 | 5/1966 | Gundlach | 117/34 |
| 3,466,189 | 9/1969 | Erb | 117/75 |
| 3,553,009 | 1/1971 | Hoegl et al. | 117/34 |
| 3,600,216 | 8/1971 | Stewart | 117/75 |

*Primary Examiner*—William R. Trenor

*Attorney, Agent, or Firm*—James J. Ralabate; James P. O'Sullivan; John H. Faro

[57] ABSTRACT

Process for preparation of photoconductive films from at least one cyclic compound of the formula:

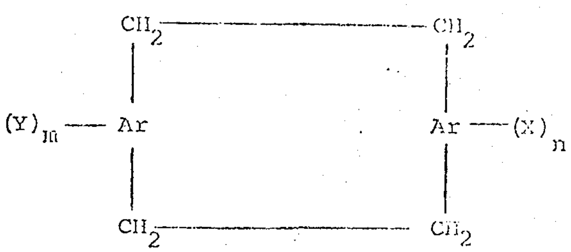

wherein

Ar is a polyaromatic nucleus selected from the group consisting of diradicals of naphthalene, anthracene, pyrene and carbazole;

X and Y are independently selected from the group consisting of halogen, $NO_2$, $NH_2$, lower alkyl, phenyl, phenoxy, carboxy, hydroxyl, lower alkyl esters and aryl esters; and

*m* and *n* range from 0 to the total number of replaceable hydrogens on the polyaromatic nucleus;

The process comprises heating at least one of the above compounds in an evacuated chamber at temperatures sufficient to vaporize said compound and thereafter cracking and condensing said vapors on a suitable surface. The temperature of the surface on which such vapors are condensed can be adjusted to either permit or retard the polymerization of the condensate. The film thus produced can be stripped from this surface or, if this surface is conductive, used in conjunction therewith as an imaging member in electrophotography.

7 Claims, 1 Drawing Figure

PROCESS FOR PREPARATION OF PHOTOCONDUCTIVE FILMS FROM INTRACTABLE MATERIALS

BACKGROUND OF THE INVENTION

1. Field of the Invention

This invention relates to an improved process and articles prepared by said process. More specifically, this invention involves a process for preparation of photoconductive films from materials generally regarded as intractable.

2. Description of the Prior Art

The formation and development of images on the imaging surfaces of photoconductive materials by electrostatic means is well known. The best known of the commercial processes, more commonly known as xerography, involves forming a latent electrostatic image on an imaging surface of an imaging member by first uniformly electrostatically charging the surface of the imaging layer in the dark and then exposing this electrostatically charged surface to a light and shadow image. The light struck areas of the imaging layer are thus rendered conductive and the electrostatic charge selectively dissipated in these irradiated areas. After the photoconductor is exposed, the latent electrostatic image on this image bearing surface is rendered visible by development with a finely divided colored electroscopic material, known in the art as "toner". This toner will by principally attracted to those areas on the image bearing surface which retain the electrostatic charge and thus form a visible powder image.

The developed image can then be read or permanently affixed to the photoconductor where the imaging layer is not to be reused. This latter practice is usually followed with respect to the binder-type photoconductive films (e.g. ZnO) where the photoconductive imaging layer is also an integral part of the finished copy.

In so-called "plain paper" copying systems, the latent image can be developed on the imaging surface of a reusable photoconductor or transferred to another surface, such as a sheet of paper, and thereafter developed. When the latent image is developed on the imaging surface of a reusable photoconductor, it is subsequently transferred to another substrate and then permanently affixed thereto. Any one of a variety of well known techniques can be used to permanently affix the toner image to the copy sheet, including overcoating with transparent films, and solvent or thermal fusion of the toner particles to the supportive substrate.

In the above plain paper copying system, the materials used in the photoconductive layer should preferably be capable of rapid switching from insulative to conductive to insulative state in order to permit cyclic use of the imaging surface. The failure of a material to return to its relatively insulative state prior to the succeeding charging sequence will result in an increase in the dark decay rate of the photoconductor. This phenomenon, commonly referred to in the art as "fatigue", has in the past been avoided by the selection of photoconductive materials possessing rapid switching capacity. Typical of the materials suitable for use in such a rapidly cycling system include anthracene, sulfur, selenium and mixtures thereof (U.S. Pat. No. 2,297,691); selenium being more preferred because of its superior photosensitivity.

More recently, a number of organic photoconductive compositions have also been developed which reportedly possess the requisite speed and spectral response to provide commercially acceptable imaging surfaces; e.g. U.S. Pat. Nos. 3,037,861 and 3,484,237. Some of the principal advantages of these polymeric compositions over the traditional inorganic materials used in electrophotography are the relative ease of fabrication, comparatively low cost and inherent flexibility. Most such polymeric photoconductive materials, however, are not competitive with inorganic materials such as selenium with respect to their photosensitivity. The term "photosensitivity" is used throughout this disclosure to describe the relative rate of photoinduced discharge of a surface charge on an imaging layer of these materials; the more rapid its rate of photoinduced discharge, the more photosensitive a material.

A number of organic materials known to possess high light sensitivity, however, cannot be readily formed into coherent photoconductive films. The use of such intractable materials is possible but generally requires their dispersion in a binder for fabrication into an imaging layer having the requisite physical and mechanical properties. Poly(9,10-dimethylene-anthracene) falls into this latter class of photoconductive materials. Typical of the teachings for the use of this material is U.K. Pat. No. 1,101,391 where this polymer is disclosed in a binder type photoconductive imaging layer. Where a polymeric material is physically dispersed throughout a binder as disclosed in the above noted British patent, its photosensitivity or rate of photoinduced discharge is concentration dependent. In other words, in order to enhance the rate of photoinduced discharge of a surface charge in such binder type films, additional amounts of polymeric photoconductive materials must be dispersed therein. As the concentration of this dispersed photoconductive material increases, the physical and mechanical properties of such films are usually adversely affected.

It is thus the object of the invention to remove this as well as related deficiencies in the prior art.

More specifically, it is an object of this invention to provide a process for fabrication of photoconductive films from intractable photoconductive materials.

Another of the objects of this invention is to provide a photoconductive composition having good ambipolar photodischarge characteristics.

Further objects of this invention include the use of the above photoconductive composition as an integral component of an imaging member and the use of such a member in an electrostatographic imaging process.

SUMMARY OF THE INVENTION

The above and related objects are achieved by providing a process for preparation of a photoconductive imaging layer from at least one cyclic compound of the formula:

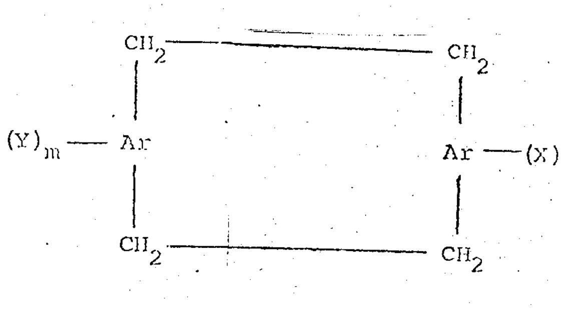

wherein

- Ar is a polyaromatic nucleus selected from the group consisting of diradicals of naphthalene, anthracene, pyrene and carbazole;
- X and Y are independently selected from the group consisting of halogen, $NO_2$, $NH_2$; lower alkyl, phenyl, phenoxy, lower alkoxy, carboxy, hydroxyl, lower alkyl esters and aryl esters;
- *m* and *n* can range from 0 to the total number of replaceable hydrogens on the polyaromatic nucleus. The process generally comprises placing at least one of the above compounds in an evacuated chamber and then heating said chamber to a temperature sufficient to vaporize said compound. The vaporized compound is then subsequently subjected to temperatures sufficient to cause pyrolytic cleavage of said compound. The products of this pyrolytic cleavage are ultimately condensed on a substrate. In the preferred embodiments of this invention, the substrate is previously chilled sufficiently to forestall and/or retard the polymerization of the vapors upon their condensation on this surface. After sufficient condensate has collected, the temperature of the substrate is allowed to increase and thus the restraint upon the polymerization of the condensate removed. The preferred cyclic compound which can be converted by the process of this invention from a highly intractable material into a coherent photoconductive film is cyclo bis(-anthracene-9,10-dimethylene).

BRIEF DESCRIPTION OF THE DRAWING

The FIGURE is an elevational in vertical cross-section through a chamber suitable for use in the process of this invention.

DESCRIPTION OF THE INVENTION INCLUDING PREFERRED EMBODIMENTS

Figure 1:
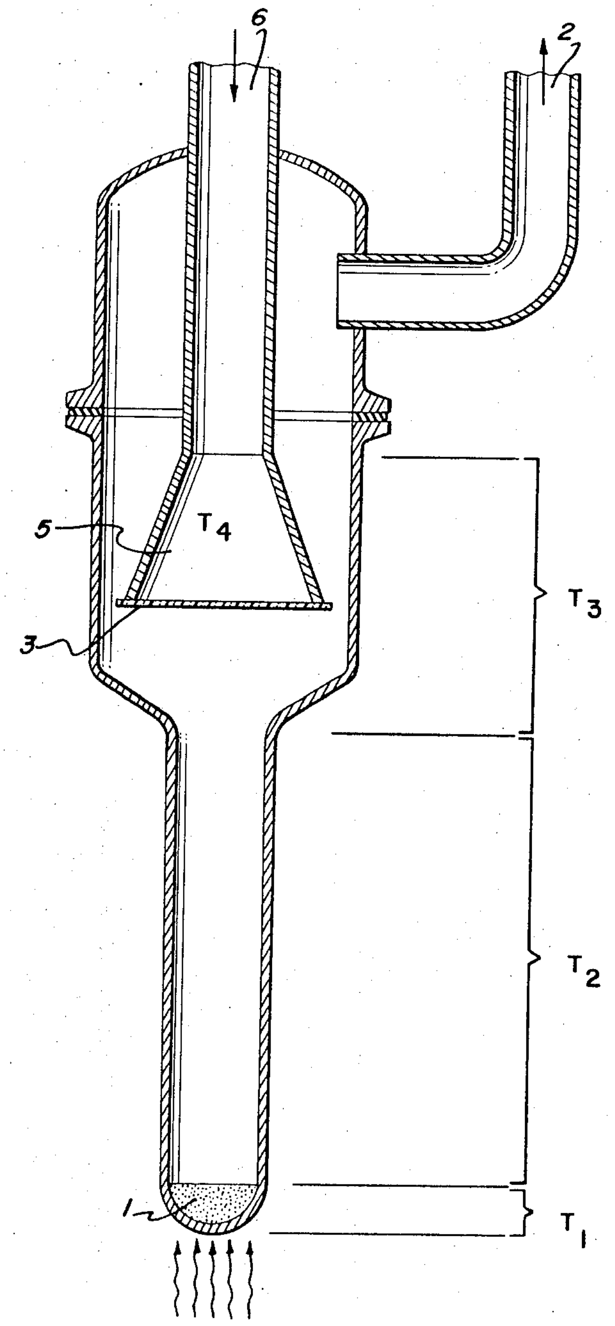

In the process of this invention, a quantity of one or more of the aforedescribed cyclic compounds is placed within a chamber of the type illustrated in the FIGURE at 1. The chamber is then sealed and evacuated through 2. After the chamber is evacuated, the compounds are heated sufficiently to effect their vaporization. The vapors which evolve undergo further heating which results in pyrolytic cleavage of the cyclic compound. The product of such cleavage is further channeled through the chamber to substrate 3 where it is collected by condensation. This substrate is shown in FIG. 1 to be in the form of a plate; however, its geometry is not critical. This substrate 3 forms the bottom of subchamber 5. Just prior to and during the vaporization and cracking phases of this process, a refrigerant gas, such as liquid nitrogen, is introduced into subchamber 5 through orifice 6. Sufficient liquid gas is introduced into the subchamber to adequately chill the substrate and thus retard and/or forestall spontaneous polymerization of the collected vapors upon their condensation on substrate 3.

After the desired amount of condensate has been collected upon the substrate, the temmperature of the substrate is allowed to increase, thereby causing the rate of polymerization of the condensate to increase.

The following series of equations are illustrative of the vaporization, cracking, condensation and polymerization of cyclo bis(anthracene-9,10-dimethylene) according to the process of this invention.

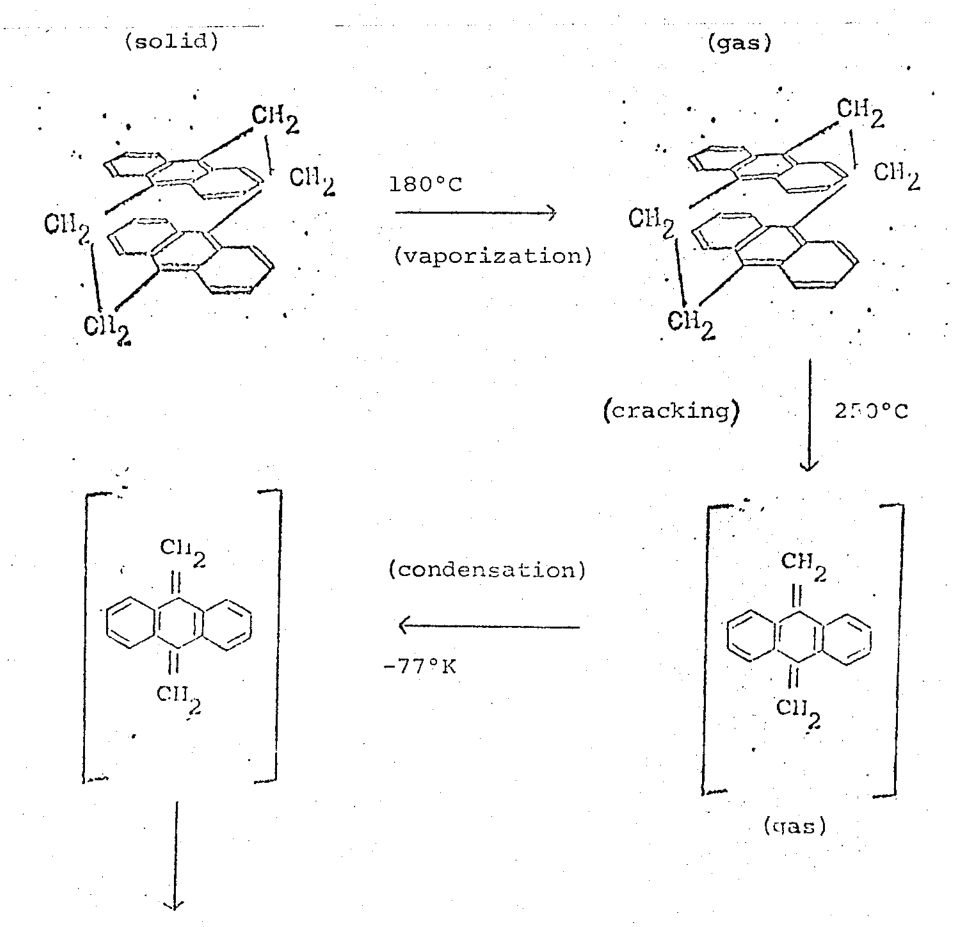

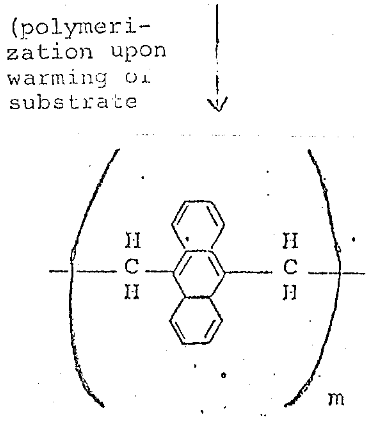

where m is at least 4

The temperatures at the various stages of conversion of cyclo bis(anthracene-9,10-dimethylene), to poly(anthracene-9,10-dimethylene) are critical. More specifically, during vaporization of the cyclic compounds of the type hereinbefore described, the temperature and efficiency of delivery of heat to the charge in the chamber is extremely important since vaporization of these compounds at too high a temperature will result in their spontaneous polymerization. Apparently, the temperatures at which these compounds vaporize and the temperatures at which they begin to polymerize overlap and, thus, it is necessary to carry out the vaporization phase of this process at a temperature where the differential between the rate of vaporization and the rate of polymerization is the greatest. This is usually achieved by maintaining the temperature zone of the chamber, designated at $T_1$ in FIG. 1, at the lowest temperature at which the vaporization of such cyclic compounds occur.

Similar rigorous control over temperature is also required of the region of the chamber intermediate between the vaporization and condensation zones. This region designated as $T_2$ of FIG. 1, is the region of the chamber in which the cyclic vapors undergo pyrolytic cleavage or cracking, thereby forming an intermediate compound which is capable of subsequent condensation and polymerization on substrate 3. The temperature in this region of the chamber is generally maintained at in excess of about 250°C.

The temperature of the third zone of the chamber, designated as $T_3$ in FIG. 1, is sufficiently elevated so as to prevent possible condensation and polymerization of these intermediate compounds. Generally, maintaining this region at in excess of about 100°C will achieve this stated purpose.

The fourth temperature zone, designated as $T_4$ in FIG. 1, is that temperature zone prevailing within subchamber 5. Ordinarily, the temperature within this region will assume substantially the same value as that of the refrigerant gas introduced therein. The temperature of plate 3 must be maintained at a level at which substantial polymerization of the condensate is forestalled until such time as the amount of condensate on said plate is adequate to yield a continuous photoconductive film useful in electrophotography.

The rate of vaporization of the cyclic compound in the above and similar systems is dependent upon the vapor pressure of a given cyclic compound at its specific vaporization temperature. The cyclic compounds used in this process have relatively low vapor pressures at tempepratures of about 180° C (this temperature generally being preferred for vaporization). Thus, in order to facilitate the vaporization of these cyclic compounds, it is desirable to admix a vaporizing agent with the cyclic compound to enhance its rate of vaporization and thereby the speed of the entire process. Any of the known vaporizing agents can be used in conjunction with said cyclic compounds, provided they do not otherwise interfere with the subsequent cracking, condensation and/or polymerization of said compounds and their corresponding intermediates. Alternatively, other certain cyclic materials may also be admixed with the cyclic compounds prior to vaporization. The materials should be capable of vaporization at or below the prevailing temperature zone and upon vaporization accelerate the rate of vaporization of the cyclic compound admixed therewith. These mixed vapors readily pass through the various temperature zones of the chamber and codeposit with one another on the condensation plate. These materials should preferably have vapor pressures substantially in excess of the cyclic compounds to which they are added and can in some instances copolymerize with the intermediates of said cyclic compounds on the condensation plate. Representative of such a preferred cyclic material is cyclo bis(benzene-1,4-dimethylene. In order for copolymerization of an intermediate of a cyclic compound to occur with cyclo bis(benzene-1,4-dimethylene), it is essential to crack both of these cyclic compounds and, therefore, the temperatures of zone $T_2$ must be sufficient to effect pyrolytic cleavage of both of these materials. Experience has shown that maintaining the temperature in this zone at between about 550°–600°C is adequate to effect such pyrolytic conversion; the intermediate formed upon cracking of cyclo bis(benzene-1,4-dimethylene) being a symetrical diradical of p-xylylene (a more complete description of the pyrolytic cleavage and vapor deposition of such cyclic compounds being found in U.S. Pat. Nos. 3,600,216 and 3,246,627).

Optional materials, such as activators and dyestuff sensitizers may also be codeposited with the product of the pyrolytic cleavage of the cyclic compounds. The procedure followed is similar to that described above; however, copolymerization of these materials with the intermediate compounds is not necessary for sensitization of the resultant photoconductive film to occur. The ultimate concentration of these optional material in the photoconductive film will generally follow the same limitations placed upon their addition the photoconductive film prepared by more conventional methods. For example, the ultimate concentration of activators which can be present in the photoconductive films prepared in accord with the process of this invention can range from about 0.1–50 weight percent, based upon the weight of the photoconductive film; with about 1–6 weight percent being preferred. The quantity of dyestuff sensitizers which can be ultimately incorporated into the above photoconductive film is similarly restricted. This photoconductive film is somewhat unique in that the photoconductive polymer can be sensitized with electron donor and electron acceptor materials.

Representative of activators which can be added to these compositions include nitrobenzene, m-dinitrobenzene; o-dinitrobenzene; p-dinitrobenzene; 1-nitro-naphthalene; 2-nitro-naphthalene; 2,5-dinitrophenapthrenequinone; 2,7-dinitrophenapthrenequinone; 3,6-dinitrophenapthrenequinone; 2,4 dinitrofluorene-$\Delta^{9,}$ -malononitrile; 2,5 dinitrofluorene-$\Delta^{9,}$ -malononitrile; 2,6 dinitrofluorene-$\Delta^{9,}$ -malononitrile; 2,7 dinitrofluorene-$\Delta^{9,}$ -malononitrile; 3,6 dinitrofluorene-$\Delta^{9,}$ -malononitrile; 2,4,7 trinitrofluorene-

UNITED STATES PATENT OFFICE
CERTIFICATE OF CORRECTION

Patent No. 3,864,144 Dated February 4, 1975

Inventor(s) Moshe Levy, James M. Pearson, Davis J. Williams

It is certified that error appears in the above-identified patent and that said Letters Patent are hereby corrected as shown below:

Column 1, line 66, change "being more preferred" to --being preferred--.

Column 4, line 25, change "spontaneoous" to --spontaneous--.

Column 4, line 29, change "temmperature" to --temperature--.

Column 5, line 69, change "tempepratures" to --temperatures--.

Column 6, line 66, change "2,4 dinitrofluorene-$\Delta^{9'}$ -malononitrile; 2,5 dinitrofluorene-$\Delta^{9'}$ -malononitrile; 2,6 dinitrofluorene-$\Delta^{9'}$ -malononitrile; 2,7 dinitrofluorene-$\Delta^{9'}$ -malononitrile; 3,6 dinitrofluorene-$\Delta^{9'}$ -malononitrile;" to --2,4 dinitrofluorene-$\Delta^{9,\alpha}$-malononitrile; 2,5 dinitrofluorene-$\Delta^{9,\alpha}$ -malononitrile; 2,6 dinitrofluorene-$\Delta^{9,\alpha}$-malononitrile; 2,7 dinitrofluorene-$\Delta^{9,\alpha}$ -malononitrile; 3,6 dinitrofluorene-$\Delta^{9,\alpha}$ -malononitrile;--.

Column 7, line 1, change "$^{9'}$ -malononitrile; 2,4,5,7 tetronitrofluorene-$\Delta^{9'}$," to --$\Delta^{9,\alpha}$ -malononitrile; 2,4,5,7 tetronitrofluorene-$\Delta^{9,\alpha}$--.

Column 7, line 6, change "dibenzo[a,c]tetracene" to --dibenzo[a,c]tetracene;--.

Column 7, line 41, change "requirs" to --requires--.

Column 8, line 26, underline the numbers 92 and 93.

Signed and sealed this 17th day of June 1975.

(SEAL)
Attest:

RUTH C. MASON
Attesting Officer

C. MARSHALL DANN
Commissioner of Patents
and Trademarks

FORM PO-1050 (10-69)
USCOMM-DC 60376-P69
☆ U.S. GOVERNMENT PRINTING OFFICE : 1969 O—366-334.